(12) United States Patent
Shih et al.

(10) Patent No.: US 7,573,459 B2
(45) Date of Patent: Aug. 11, 2009

(54) PIXEL STRUCTURE FOR LCD WITH EMBEDDED TOUCH SCREEN

(75) Inventors: Po-Sheng Shih, Tao-Yuan Hsien (TW); Bo-Yang Chen, Tao-Yuan Hsien (TW)

(73) Assignee: HannStar Display Corp., Tao-Yuan Hsien (TW)

( * ) Notice: Subject to any disclaimer, the term of this patent is extended or adjusted under 35 U.S.C. 154(b) by 766 days.

(21) Appl. No.: 11/341,290

(22) Filed: Jan. 27, 2006

(65) Prior Publication Data
US 2007/0176905 A1    Aug. 2, 2007

(51) Int. Cl.
G09G 3/36    (2006.01)

(52) U.S. Cl. ............... 345/104; 345/87; 345/93; 345/173; 345/175; 345/55; 349/12; 349/56; 349/139

(58) Field of Classification Search .......... 345/87–104, 345/55, 50, 38, 173–182, 3.1, 12; 349/12, 349/56, 139
See application file for complete search history.

(56) References Cited

U.S. PATENT DOCUMENTS 7,084,848 B2 * 8/2006 Senda et al. ............... 345/92
7,280,167 B2 * 10/2007 Choi et al. ................. 349/12
2003/0179323 A1 * 9/2003 Abileah et al. ............ 349/24

* cited by examiner

Primary Examiner—Richard Hjerpe
Assistant Examiner—Ishara T Perumpulliarachchige
(74) Attorney, Agent, or Firm—Volpe and Koenig, PC

(57) ABSTRACT

A pixel structure for an liquid crystal display (LCD) with an embedded touch screen is provided. The pixel structure includes a plurality of first pixels and a plurality of second pixels, each formed by intersecting two adjacent gate lines and two adjacent data lines, the first pixel including a pixel transistor having a gate electrode connected to one of the gate lines, a drain electrode connected to one of the data lines, and a source electrode; a pixel electrode connected to the source electrode of the pixel transistor; a liquid crystal capacitor $C_{LC}$ formed between the pixel electrode and a common electrode; a compensation capacitor $C_C$ formed between the pixel electrode and a compensation electrode; and the second pixel including a pixel transistor having a gate electrode connected to one of the gate lines, a drain electrode connected to one of the data lines, and a source electrode; a pixel electrode connected to the source electrode of the pixel transistor; a liquid crystal capacitor $C_{LC}''$ formed between the pixel electrode and a common electrode; a readout capacitor $C_{read-out}$ between the pixel electrode and a readout line, wherein the pixel electrode is positioned above the readout line, and the pixel electrode and the readout line are overlapped.

19 Claims, 13 Drawing Sheets

PIXEL STRUCTURE FOR LCD WITH EMBEDDED TOUCH SCREEN

FIELD OF THE INVENTION

The present invention relates to a pixel structure for the LCD, and more particularly to a pixel structure for the LCD with am embedded touch screen.

BACKGROUND OF THE INVENTION

TFT LCDs with touch screens have become popular in displays for industrial and retail applications, as well as in PDAs and emerging tablet PC products. The majority of touch-enabled AMLCDs (Active Matrix LCDs) are based on the resistive, capacitive or inductive touch technology. All these solutions require externally added components or screens, which would add cost and reduce the optical performance of the LCD. For example, the most commonly used and currently lowest cost approach is based on resistive touch screens, which reduce display transmittance by about 20%, increase reflectance and have a limited lifetime.

Therefore, the optical sensors are designed and integrated into the embedded touch screen during the TFT-LCD array process for solving the above-mentioned defects. In the optical sensors, the optical currents are sensed to achieve the orientation function. Since the optical sensors are compatible with the TFT-LCD array process, the production cost therefore would not be increased. Besides, it is unnecessary to use the sensing film for the touch screen. Furthermore, the optical performance of the LCD is better and the lifetime thereof is longer.

Please refer to FIG. 1, which shows the layout of an embedded touch screen in the prior art. As shown in FIG. 1, the embedded touch screen is composed of a plurality of display pixels and readout pixels, and a display pixel 11 comprises a display element and a readout pixel 12 comprises both a display element and an optical sensor element 12. Please refer to FIG. 2, which shows the equivalent circuit of the embedded touch screen of FIG. 1. As shown in FIG. 2, a 240×240 pixel TFT LCD was built with optical sensor elements interspersed among the pixels at every $8^{th}$ row gate line and every $8^{th}$ column data line. The display is based on an existing avionics LCD platform with an RGBW (Red, Green, Blue, White) quad pixel format. The optical sensor elements are located at every $4^{th}$ white subpixel. Each optical sensor element consists of an a-Si photo TFT 331 with gate shorted to source, a storage capacitor $C_{st2}$ and a readout TFT 332, and each optical sensor element has three terminals. The SW terminal 13 determines the output of a signal, and the signal is read out from the Readout terminal 14 when the SW terminal 13 is activated. The Bias terminal 15 provides the optical sensor element a bias voltage. The SW terminal 13 is connected to gate of the readout TFT 332, the Readout terminal 14 is connected to the readout line 11, and the Bias terminal 15 is connected to a voltage source, such as a bias line of FIG. 2. The readout TFTs are connected to added readout lines running parallel to the column data lines. The photo TFTs are connected to the bias line which is common for all optical sensor components and is held at 0 to −10V Please refer to FIG. 3(a), which shows a cross-sectional view of photo TFT 331 and readout TFT 332 in the embedded touch screen of FIG. 1. The embedded touch screen includes a upper substrate 31 with the color filter 311, an opening 312 and the black matrix 313 disposed thereon. The embedded touch screen also includes a lower substrate 33 with the photo TFT 331 and the readout TFT 332 disposed thereon, and the liquid crystal molecules are filled between the first and the second substrates 31, 33. The photo TFT 331 discharges the storage capacitor $C_{st2}$ when exposed to ambient light through the opening 312 in the black matrix 313. The optical sensor elements share the same gate line with each $8^{th}$ row of display pixels. Hence, the row and column drivers are identical to those in a TFT LCD without the optical sensor array.

The photo TFTs and readout TFTs are manufactured in the same process as the addressing TFTs for the AMLCD, so that the processing is identical to that for a conventional TFT LCD without the optical sensor elements. The added optical sensor elements require only a fraction of the subpixel area and have therefore a minor impact on the pixel aperture and transmittance of the display.

The 60 readout lines for the 60×60 optical sensor elements are connected to a readout chip (not shown) with 60 channels of charge amplifiers 21 (shown in FIG. 2) as inputs. The readout chip converts the readout charges to voltages that are multiplexed to a serial signal for output to an A/D converter and subsequent image processing. The timing for the signal acquisition and data output of the readout chip is derived from the display controller (not shown) and synchronized with the display driven at a frame rate of 60 Hz.

When the display is touched, the ambient light is locally blocked by one or a few of the optical sensor elements. The surrounding optical sensors are exposed to the ambient light through the opening 312 in the black matrix 313. The storage capacitors of the surrounding optical sensor elements will be partially or completely discharged. Each time a row of optical sensor elements is read out, a current flows through the readout lines that is proportional to the integrated light exposure on the photo TFTs during the preceding frame period.

Please refer to FIGS. 3(b) and 3(c), which respectively show cross-sectional views of a display pixel and a readout pixel along cutting lines b-b' and c-c' of FIG. 1. In the display pixel of FIG. 3(b), a data line 333, an insulating layer 334, and a pixel electrode 335, which is electrically connected with the source of the pixel TFT, are sequentially formed on the lower substrate 33. The black matrix 313 formed on the upper substrate 31 covers the data line 333 and portions of the pixel electrode 335 to prevent light leak. In the readout pixel of FIG. 3(c), a data line 333, a readout line 336, an insulating layer 334, and a pixel electrode 335, which is electrically connected with the source of the pixel TFT, are sequentially formed on the lower substrate 33. The black matrix 313 formed on the upper substrate 31 covers the data line 333, the readout line 336, and portions of the pixel electrode 334 to prevent light leak. In comparison with the display pixel, the black matrix 313 in the readout pixel has an additionally area covering the readout line 336 and the region between the data line 333 and the readout line 335. Therefore, the aperture ratio and the optical performance of the readout pixel are affected.

Please refer to FIGS. 4(a) and 4(b), which show the equivalent circuit of a display pixel in the embedded touch screen in the prior art and the equivalent circuit of a readout pixel in the embedded touch screen in the prior art, respectively. Specially, FIG. 4(b) only shows the display element of the readout pixel, and the optical sensor element is omitted. In the display pixel of FIG. 4(a), the pixel TFT 41 has a gate connected to the $n^{th}$ gate line and a drain connected to the $n^{th}$ data line. $C_{LC}$ is formed between a pixel electrode, which is connected to the source of the pixel TFT 41, and a common electrode, which is connected to common voltage source. $C_{ST}$ is formed between the pixel electrode, which is connected to the source of the pixel TFT 41, and a common line, which is also connected to common voltage source. $C_{GS}$ is formed between the gate and the source of the pixel TFT 41. In the readout pixel of FIG. 4(b), $C'_{LC}$ is formed between a pixel electrode, which is connected to the source of the pixel TFT 41, and a common electrode, which is connected to common voltage source. $C'_{ST}$ is formed between a pixel electrode, which is connected to the source of the pixel TFT 41, and a common line, which is also connected to common voltage source. $C_{read\text{-}out}$ is formed between the pixel electrode, which is connected to the source of the pixel TFT 41, and a readout line. $C_{GS}$ is formed between the gate and the source of the pixel TFT 41. In comparison, $C'_{LC}$ and $C'_{ST}$ are slightly different from $C_{LC}$ and $C_{ST}$, respectively, due to the fact that some pixel area is reserved for the optical sensor element including photo TFT and the readout TFT. However, $C_{GS}$ in the display pixel is the same as $C_{GS}$ in the readout pixel.

Besides the consideration of the charge for the pixel, the cooperation with the system driving should also be considered. For the middle-to-small sized LCD, the Row-Inversion driving method with common voltage, Vcom, modulation is commonly used to reduce the output range of the data signal of a data driver. Please refer to FIGS. 5(a) and 5(b), which are schematic diagrams showing the Row-Inversion driving method with Vcom modulation at Odd Frame in the prior art and the Row-Inversion driving method with Vcom modulation at Even Frame in the prior art, respectively. In the Row-Inversion driving method with Vcom modulation respectively shown in FIGS. 5(a) and 5(b), the optical sensor is embedded in the sub-pixel of blue color, so the readout line is extended within the sub-pixel of blue color. Moreover, in FIGS. 5(a) and 5(b), the symbol "+" means that the pixel electrode voltage, Vpixel, potential is higher than the Vcom potential, while the symbol "−" means that the Vpixel potential is lower than the Vcom potential.

Please refer to FIGS. 6(a) and 6(b), which show the simulation result of Vpixel respectively in the display pixel and the readout pixel with Row$_n$ at Odd Frame (Row$_{n+1}$ at Even Frame) during the pixel charge period in the prior art and the simulation result of Vpixel respectively in the display pixel and the readout pixel with Row$_n$ at Even Frame (Row$_{n+1}$ at Odd Frame) during the pixel discharge period in the prior art. In terms of the charging capacity, the charging speed would slow down because of the load caused by the capacitor $C_{read\text{-}out}$. However, the input of the grey level voltage would not be affected since there is enough switch-on time for the TFT. Nevertheless, another issue would be generated due to the Vcom modulation.

Because of the Vcom modulation, Vpixel would swing with the potential of Vcom when the TFT is switched off. Since the readout pixel has the capacitor $C_{read\text{-}out}$, the voltage swing thereof is different from that of the display pixel, as shown in FIGS. 6(a) and 6(b). This would cause the inconsistency of the grey level control. The difference could be seen from the following Formula (a) and Formula (b).

$$\Delta V_{normal} = \frac{C_{LC} + C_{ST}}{C_{LC} + C_{ST} + C_{GS}}(V_{com,H} - V_{com,L}) \quad (a)$$
$$\cong (V_{com,H} - V_{com,L})$$

$$\Delta V_{read\text{-}out} = \frac{C'_{LC} + C'_{ST}}{C'_{LC} + C'_{ST} + C_{read\text{-}out} + C'_{GS}}(V_{com,H} - V_{com,L}) \quad (b)$$
$$\Rightarrow \Delta V_{normal} > \Delta V_{read\text{-}out}$$

From the above description, it is known that how to develop a pixel structure for the LCD with the embedded touch screen has become a major problem to be solved. In order to overcome the drawbacks in the prior art, an improved pixel structure for the LCD with the embedded touch screen is provided. The particular design in the present invention not only solves the problems described above, but also is easy to be implemented. Thus, the invention has the utility for the industry.

SUMMARY OF THE INVENTION

In accordance with the first aspect of the present invention, a pixel structure for the LCD with the embedded touch screen is provided. In the present invention, a compensation capacitor is added in the display pixel so that the grey level inconsistency between the display pixel and the readout pixel is eliminated.

In accordance with the second aspect of the present invention, a pixel structure for an liquid crystal display (LCD) with an embedded touch screen is provided. The pixel structure includes a plurality of first pixels and a plurality of second pixels, each formed by intersecting two adjacent gate lines and two adjacent data lines, the first pixel including a pixel transistor having a gate electrode connected to one of the gate lines, a drain electrode connected to one of the data lines, and a source electrode; a pixel electrode connected to the source electrode of the pixel transistor; a liquid crystal capacitor $C_{LC}$ formed between the pixel electrode and a common electrode; a compensation capacitor $C_C$ formed between the pixel electrode and a compensation electrode; and the second pixel including a pixel transistor having a gate electrode connected to one of the gate lines, a drain electrode connected to one of the data lines, and a source electrode; a pixel electrode connected to the source electrode of the pixel transistor; a liquid crystal capacitor $C_{LC}''$ formed between the pixel electrode and a common electrode; a readout capacitor $C_{read\text{-}out}$ between the pixel electrode and a readout line, wherein the pixel electrode is positioned above the readout line, and the pixel electrode and the readout line are overlapped.

Preferably, the first pixel further includes a storage capacitor $C_{ST}$ formed between the pixel electrode and a common line, and the second pixel further includes a first storage capacitor $C_{ST}''$ formed between the pixel electrode and a common line.

Preferably, both the common electrode and the common line of the first pixel and the second pixel are connected to a common voltage source.

Preferably, the readout line of the second pixel is parallel with the data lines.

Preferably, the second pixel further includes a photo transistor, a readout transistor, and a second storage capacitor composing an optical sensor element.

Preferably, the compensation electrode of the first pixel is the gate line that is not electrically connected to the transistor.

Preferably, the compensation electrode of the compensation capacitor is an external electrode.

Preferably, the external electrode is parallel with the data line and has a constant potential.

Preferably, when a two-level driving method is applied to the LCD with an embedded touch screen, the capacitors of the first pixel and the second pixel have capacitances corresponding to the following equation:

$$C_C = \Delta C_{LC} + C_{read\text{-}out}$$

wherein $\Delta C_{LC} \equiv C''_{LC} - C_{LC}$.

Preferably, when a two-level driving method is applied to the LCD with an embedded touch screen, the capacitors of the first pixel and the second pixel have capacitances corresponding to the following equation:

$$C_{ST} + C_C = \Delta C_{LC} + C''_{ST} + C_{read\text{-}out}$$

wherein $\Delta C_{LC} \equiv C''_{LC} - C_{LC}$.

Preferably, when a row-inversion driving method with the common voltage modulation is applied to the LCD with an embedded touch screen, the capacitors of the first pixel and the second pixel have capacitances corresponding to the following two equations:

$$\frac{C''_{LC} + C''_{ST}}{C''_{LC} + C''_{ST} + C_{read-out}C_{GS}} = \frac{C_{LC} + C_{ST}}{C_{LC} + C_{ST} + C_C + C_{GS}}$$

and $$\frac{C_{LC} + C_{ST}}{C''_{LC} + C''_{ST}} \cong 1$$

where $C_{GS}$ is a parasitic capacitor formed between the gate electrode and the source electrode of the pixel transistor.

Preferably, the second pixel is a readout pixel.

In accordance with the third aspect of the present invention, a pixel structure for an liquid crystal display (LCD) with an embedded touch screen is provided. The pixel structure includes a plurality of first pixels and a plurality of second pixels, each formed by intersecting two adjacent gate lines and two adjacent data lines, the first pixel including a pixel transistor having a gate electrode connected to one of the gate lines, a drain electrode connected to one of the data lines, and a source electrode; a pixel electrode connected to the source electrode of the pixel transistor; a liquid crystal capacitor $C_{LC}$ formed between the pixel electrode and a common electrode; a storage capacitor $C_{ST}$ formed between the pixel electrode and a common line; and the second pixel including a pixel transistor having a gate electrode connected to one of the gate lines, a drain electrode connected to one of the data lines, and a source electrode; a pixel electrode connected to the source electrode of the pixel transistor; a liquid crystal capacitor $C_{LC}''$ formed between the pixel electrode and a common electrode; a readout capacitor $C_{read-out}$ between the pixel electrode and a readout line, wherein the pixel electrode is positioned above the readout line, and the pixel electrode and the readout line are overlapped.

Preferably, the second pixel further includes a first storage capacitor $C_{ST}''$ formed between the pixel electrode and a common line.

Preferably, the readout line of the second pixel is parallel with the data lines.

Preferably, the second pixel further includes a photo transistor, a readout transistor, and a second storage capacitor composing an optical sensor element.

Preferably, when a two-level driving method is applied to the LCD with an embedded touch screen, the capacitors of the first pixel and the second pixel have capacitances corresponding to the following equation:

$$C_{ST} = \Delta C_{LC} + C_{read-out}$$

wherein $\Delta C_{LC} \equiv C''_{LC} - C_{LC}$.

Preferably, when a two-level driving method is applied to the LCD with an embedded touch screen, the capacitors of the first pixel and the second pixel have capacitances corresponding to the following equation:

$$C_{ST} = \Delta C_{LC} + C''_{ST} + C_{read-out}$$

wherein $\Delta C_{LC} \equiv C''_{LC} - C_{LC}$.

Preferably, the second pixel is a readout pixel.

The above objects and advantages of the present invention will become more readily apparent to those ordinarily skilled in the art after reviewing the following detailed descriptions and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for the purposes of illustration and description only; it is not intended to be exhaustive or to be limited to the precise form disclosed.

Figure 7A:
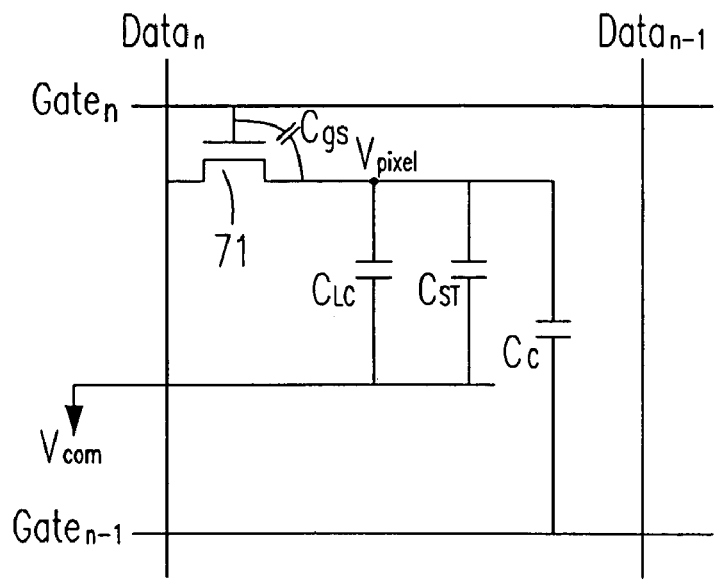
FIG. 7(a) shows the equivalent circuit of a display pixel in the embedded touch screen according to a preferred embodiment of the present invention.

Please refer to FIG. 7(a), which shows the equivalent circuit of a display pixel in the embedded touch screen according to a preferred embodiment of the present invention. The display pixel is formed by intersecting the $n^{th}$ gate line, the $n-1^{th}$ gate line, the $n^{th}$ data line and the $n-1^{th}$ data line. The display pixel includes a pixel TFT 71, a liquid crystal capacitor $C_{LC}$, a storage capacitor $C_{ST}$ and a compensation capacitor $C_C$. The pixel TFT 71 has a gate electrode connected to the $n^{th}$ gate line, a drain electrode connected to the $n^{th}$ data line, and a source electrode. The $C_{LC}$ is formed between a pixel electrode, which is connected to the source electrode of the pixel TFT 71, and common electrode, which is connected to common voltage source, wherein the common voltage line is parallel with the $n^{th}$ gate line and the $n-1^{th}$ gate line. The $C_{ST}$ is formed between the pixel electrode, which is connected to the source electrode of the pixel TFT 71, and a common line, which is also connected to common voltage source. The $C_{GS}$ is formed between the gate electrode of the pixel TFT 71 and the source electrode of the pixel TFT 71. The $C_C$ is formed between the pixel electrode, which is connected to the source electrode of the pixel TFT 71, and the $n-1^{th}$ gate line. display The equivalent circuit of the readout pixel in the embedded touch screen of the present invention is the same as that of the prior art, as shown in FIG. 7(c). Specially, FIG. 7(c) only shows the display element of the readout pixel, and the optical sensor element is omitted. The readout pixel includes the pixel TFT 71, a liquid crystal capacitor $C''_{LC}$, a storage capacitor $C''_{ST}$ and a readout capacitor $C_{read-out}$. The $C''_{LC}$ is formed between a pixel electrode, which is connected to the source electrode of the pixel TFT 71, and a common electrode, which is connected to common voltage source. The $C''_{ST}$ is formed between the pixel electrode, which is connected to the source electrode of the pixel TFT 71, and a common line, which is also connected to common voltage source. The $C_{GS}$ is formed between the gate electrode of the pixel TFT 71 and the source electrode of the pixel TFT 71. The $C_{read-out}$ is formed between the pixel electrode, which is connected to the source electrode of the pixel TFT 71, and a readout line, wherein the readout line is parallel with the $n^{th}$ data line and the $n-1^{th}$ data line.

Figure 7B:
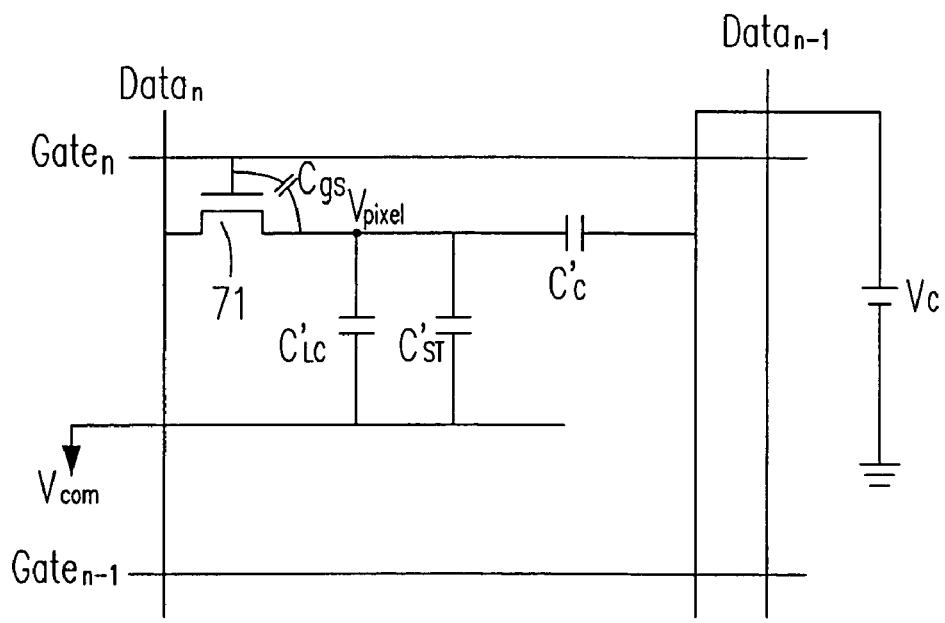
FIG. 7(b) shows the equivalent circuit of a display pixel in the embedded touch screen according to another preferred embodiment of the present invention.
Figure 7C:
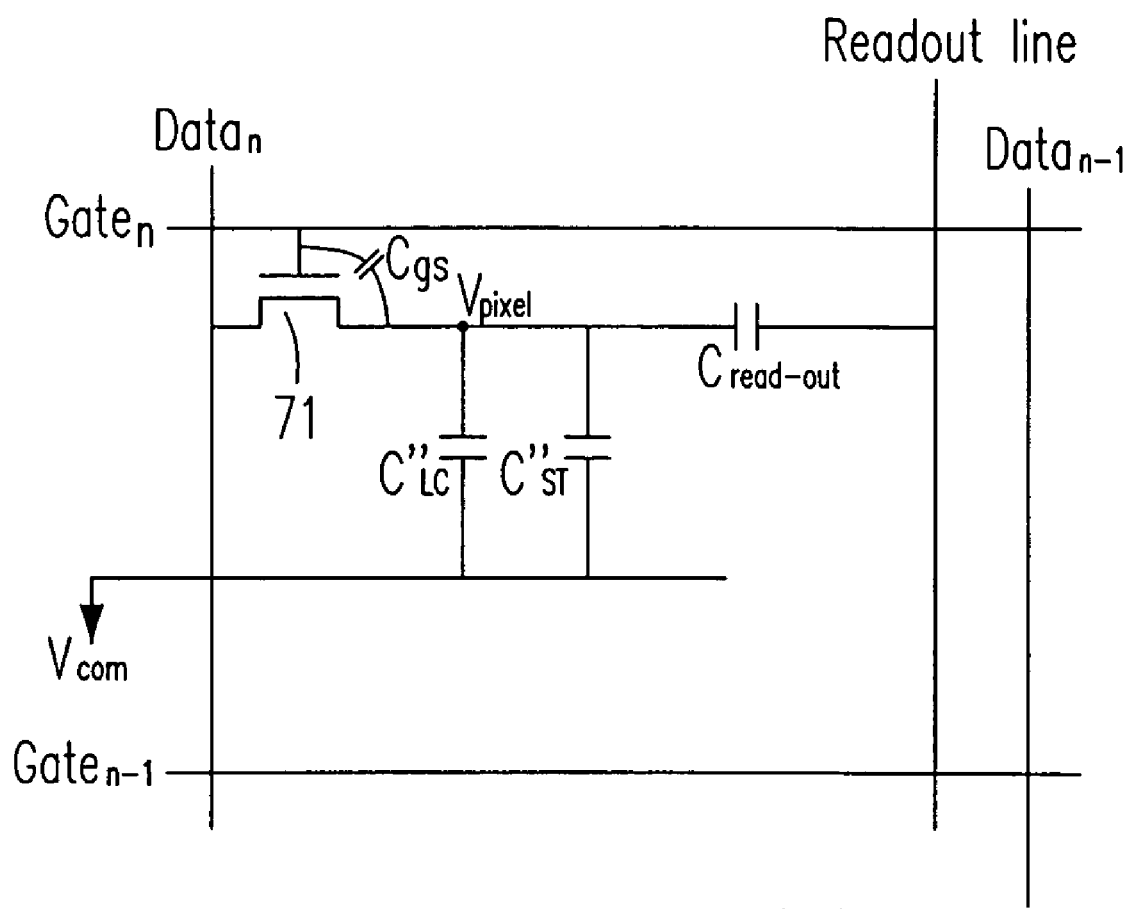
FIG. 7(c) shows the equivalent circuit of a readout pixel in the embedded touch screen according to a preferred embodiment of the present invention.

Please refer to FIG. 7(b), which shows the equivalent circuit of a display pixel in the embedded touch screen according to another preferred embodiment of the present invention. The display pixel is formed by intersecting the $n^{th}$ gate line, the $n-1^{th}$ gate line, the $n^{th}$ data line and the $n-1^{th}$ data line. The display pixel includes the pixel TFT 71, a liquid crystal capacitor $C'_{LC}$, a storage capacitor $C'_{ST}$ and a compensation capacitor $C'_C$. The pixel TFT 71 has a gate electrode connected to the $n^{th}$ gate line, a drain electrode connected to the $n^{th}$ data line, and a source electrode. The $C'_{LC}$ is formed between a pixel electrode, which is connected to the source electrode of the pixel TFT 71, and a common electrode, which is connected to common voltage source. The $C'_{ST}$ is formed between the pixel electrode, which is connected to the source electrode of the pixel TFT 71, and a common line, which is also connected to common voltage source, wherein the common line is parallel with the $n^{th}$ gate line and the $n-1^{th}$ gate line. The $C'_C$ is formed between the pixel electrode, which is connected to the source electrode of the pixel TFT 71, and an external electrode having a constant potential. The $C_{GS}$ is formed between the gate electrode of the pixel TFT 71 and the source electrode of the pixel TFT 71. display When using the Row-Inversion driving method with the $V_{com}$ modulation, the capacitances of the above-mentioned capacitors are determined for eliminating the difference of pixel electrode voltage $V_{pixel}$ between the display pixel and the readout pixel. The display pixel of FIG. 7(a) must satisfy the following equation (1) and equation (2) so as to achieve the effective compensation.

$$s \equiv \frac{C''_{LC} + C''_{ST}}{C''_{LC} + C''_{ST} + C_{read-out} + C_{GS}} \qquad (1)$$

$$= \frac{C_{LC} + C_{ST}}{C_{LC} + C_{ST} + C_C + C_{GS}}$$

$$\Rightarrow C_C = \frac{1-s}{s}(C_{LC} + C_{ST}) - C_{GS}$$

$$t \equiv \frac{C_{LC} + C_{ST}}{C''_{LC} + C''_{ST}} \cong 1 \qquad (2)$$

Similarly, The display pixel of FIG. 7(b) must satisfy the following equation (3) and equation (4) during the design process.

$$s \equiv \frac{C''_{LC} + C''_{ST}}{C''_{LC} + C''_{ST} + C_{read-out} + C_{GS}} \qquad (3)$$

$$= \frac{C'_{LC} + C'_{ST}}{C'_{LC} + C'_{ST} + C'_C + C_{GS}}$$

$$\Rightarrow C'_C = \frac{1-s}{s}(C'_{LC} + C'_{ST}) - C_{GS}$$

$$t \equiv \frac{C'_{LC} + C'_{ST}}{C''_{LC} + C''_{ST}} \cong 1 \qquad (4)$$

Figure 8B:
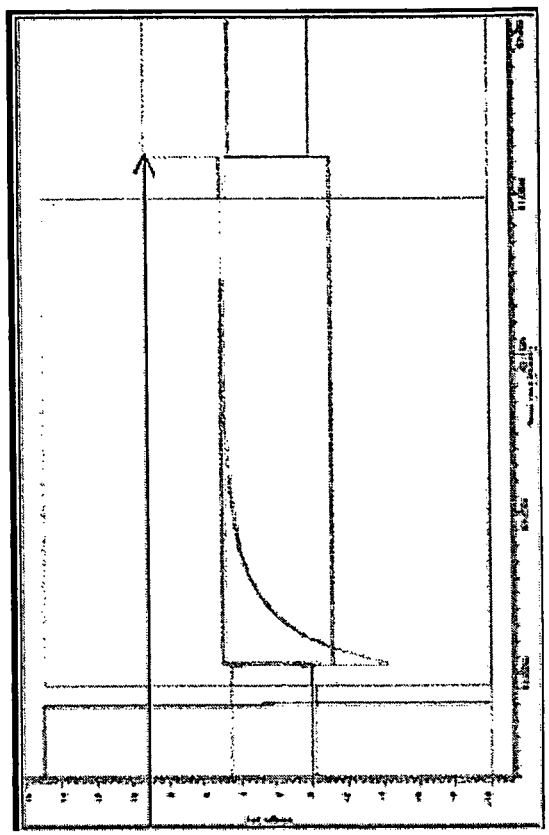
FIG. 8(b) shows the simulation result of $V_{pixel}$ respectively in the display pixel and the readout pixel with $Row_n$ at Odd Frame/$Row_{n+1}$ at Even Frame according to a preferred embodiment of the present invention.
Figure 8A:
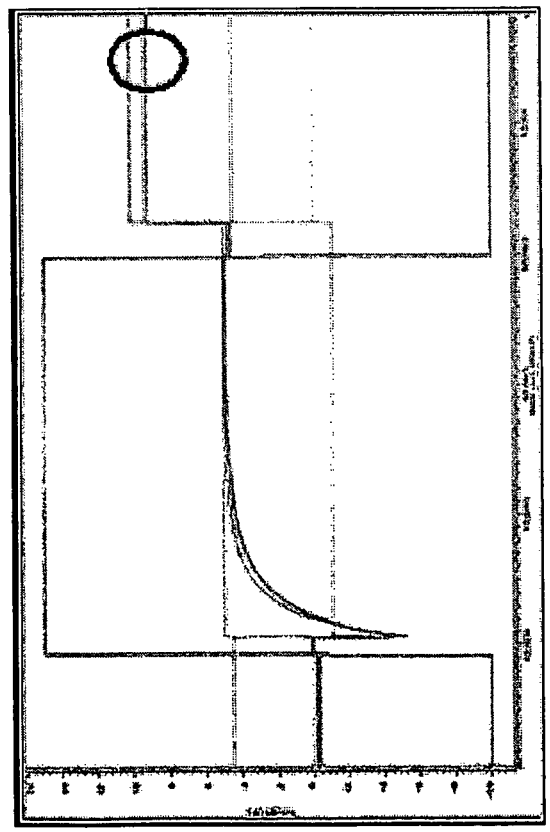
FIG. 8(a) shows the simulation result of $V_{pixel}$ respectively in the display pixel and the readout pixel with $Row_n$ at Odd Frame/$Row_{n+1}$ at Even Frame in the prior art.
Figure 9B:
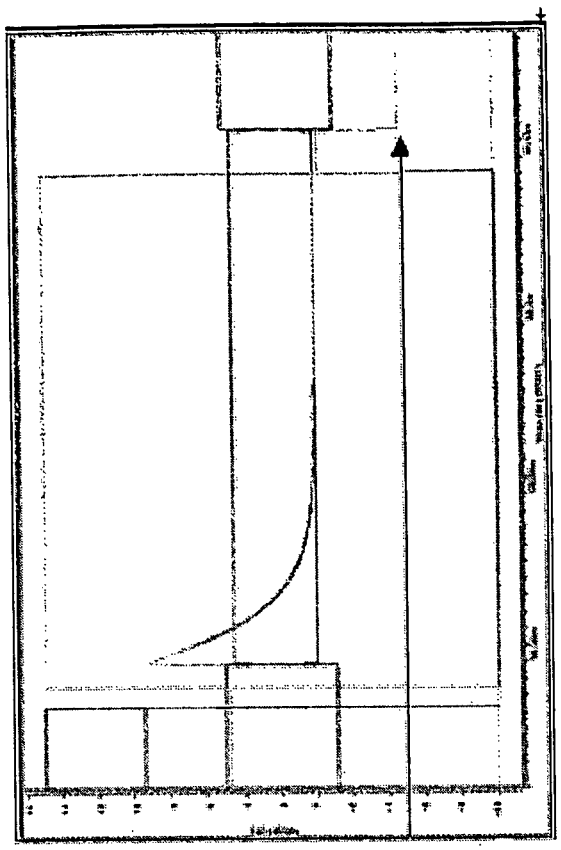
FIG. 9(b) shows the simulation result of $V_{pixel}$ respectively in the display pixel and the readout pixel with $Row_n$ at Even Frame/$Row_{n+1}$ at Odd Frame according to a preferred embodiment of the present invention.
Figure 9A:
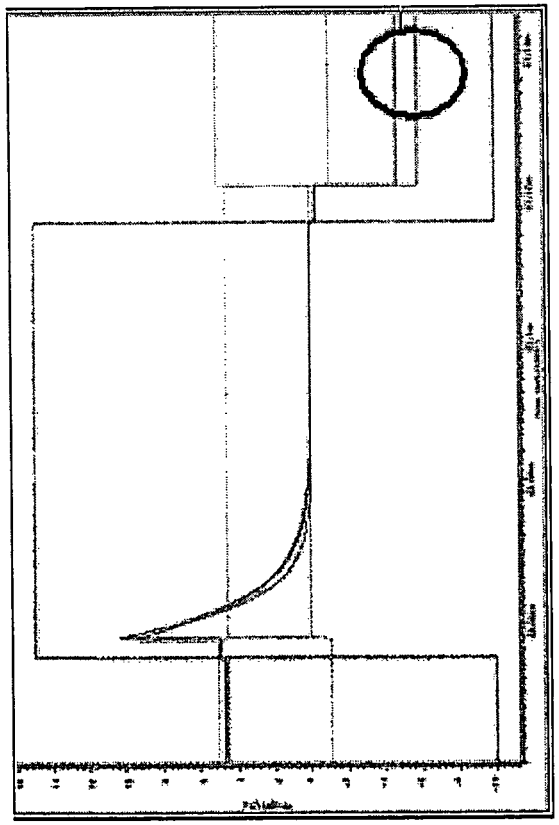
FIG. 9(a) shows the simulation result of $V_{pixel}$ respectively in the display pixel and the readout pixel with $Row_n$ at Even Frame/$Row_{n+1}$ at Odd Frame in the prior art.

Please refer to FIGS. 8(a), 8(b), 9(a) and 9(b). FIG. 8(a) shows the simulation result of pixel electrode voltage, $V_{pixel}$, respectively in the display pixel and the readout pixel with $Row_n$ at Odd Frame/$Row_{n+1}$ at Even Frame) in the prior art. FIG. 8(b) shows the simulation result of $V_{pixel}$ respectively in the display pixel and the readout pixel with $Row_n$ at Odd Frame/$Row_{n+1}$ at Even Frame) according to a preferred embodiment of the present invention. FIG. 9(a) shows the simulation result of $V_{pixel}$ respectively in the display pixel and the readout pixel with $Row_n$ at Even Frame/$Row_{n+1}$ at Odd Frame in the prior art. FIG. 9(b) shows the simulation result of $V_{pixels}$ respectively in the display pixel and the readout pixel with $Row_n$ at Even Frame/$Row_{n+1}$ at Odd Frame according to a preferred embodiment of the present invention. It is apparent from FIGS. 8(a), 8(b), 9(a) and 9(b) that after the compensation capacitor is added to the display pixel, the charging of the display pixel tends to be identical to that of the readout pixel, and the grey level inconsistency therebetween caused by the $C_{read-out}$ under the Row-Inversion driving method with the Vcom modulation is eliminated.

Figure 4A:
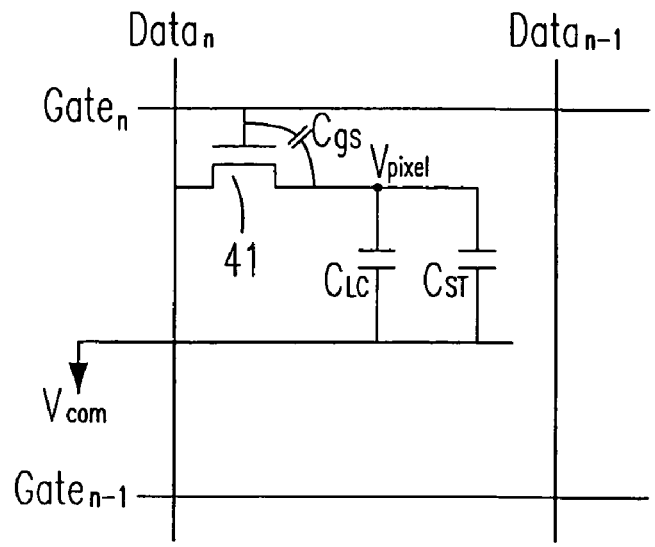
FIG. 4(a) shows the equivalent circuit of a display pixel in the embedded touch screen in the prior art.
Figure 4B:
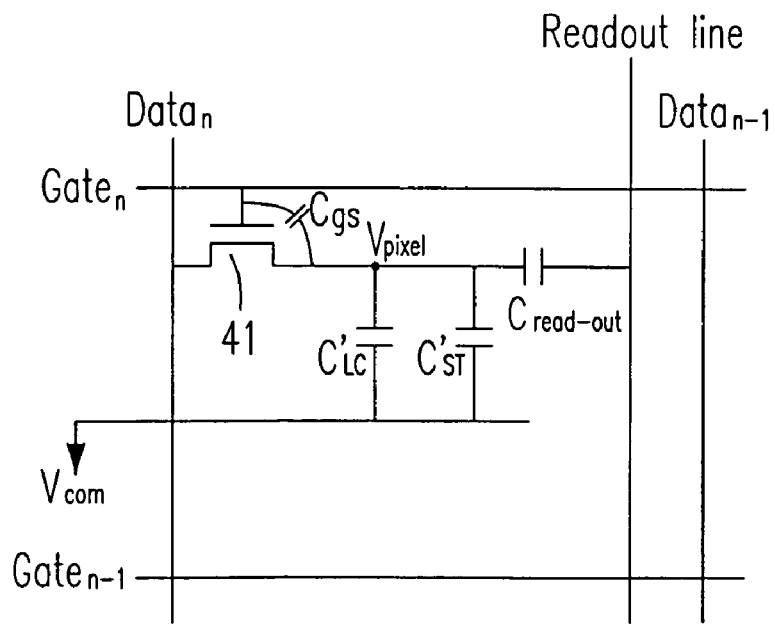
FIG. 4(b) shows the equivalent circuit of a readout pixel in the embedded touch screen in the prior art.
Figures 5A, 5B:
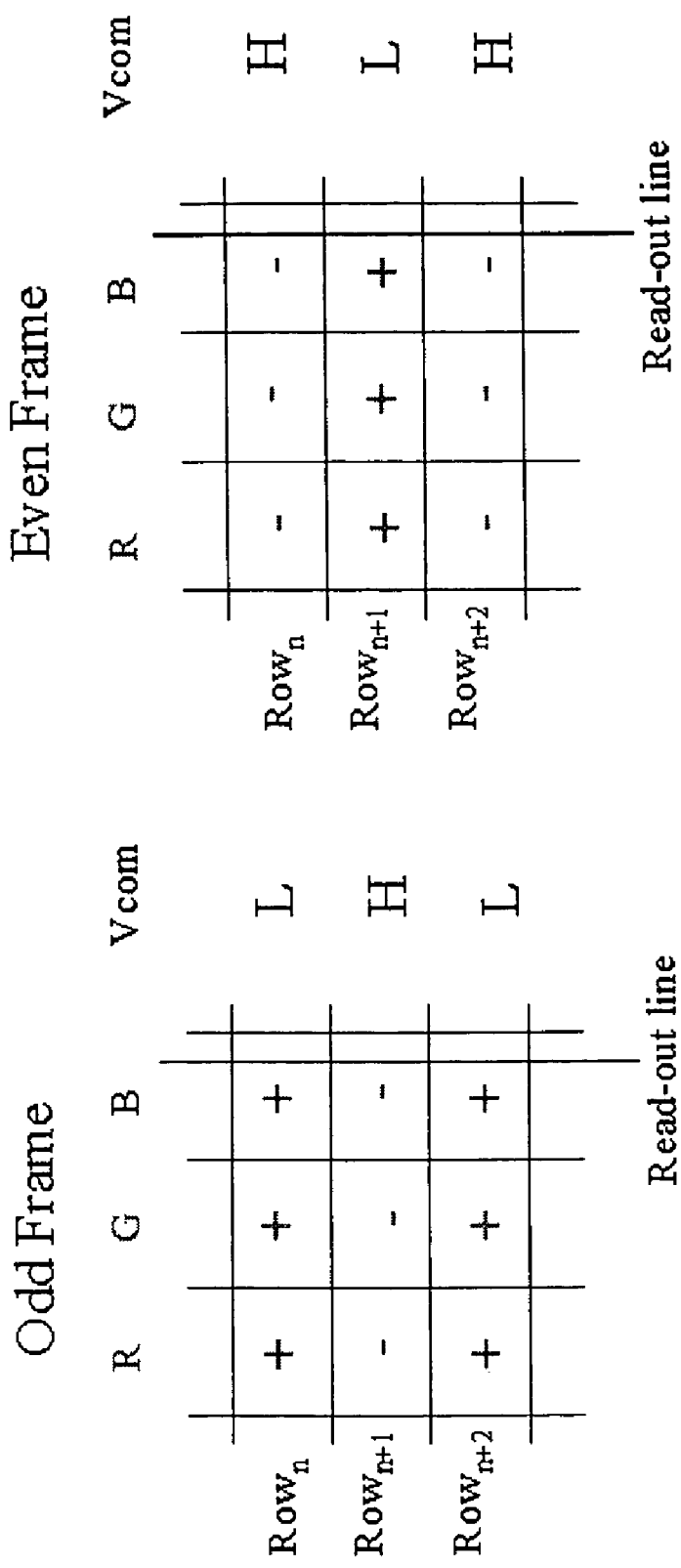
FIG. 5(a) is a schematic diagram showing the Row-Inversion driving method with $V_{com}$ modulation at Odd Frame in the prior art.
FIG. 5(b) is a schematic diagram showing the Row-Inversion driving method with $V_{com}$ modulation at Even Frame in the prior art.
Figure 6A:
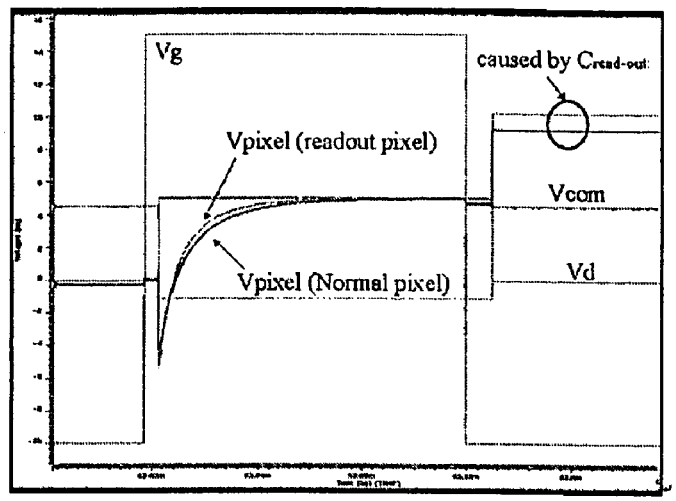
FIG. 6(a) shows the simulation result of $V_{pixel}$ respectively in the display pixel and the readout pixel with $Row_n$ at Odd Frame/$Row_{n+1}$ at Even Frame during the pixel charge period in the prior art.
Figure 6B:
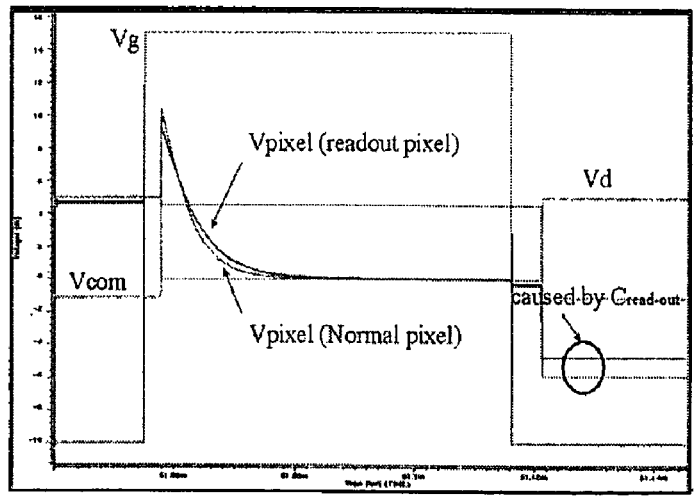
FIG. 6(b) shows the simulation result of $V_{pixel}$ respectively in the display pixel and the readout pixel with $Row_n$ at Even Frame/$Row_{n+1}$ at Odd Frame during the pixel discharge period in the prior art.

For the LCD with an embedded touch screen using the two-level driving method, the present invention adjusts the $C_{ST}$ or both the $C_{ST}$ and the $C_C$ of the display pixel to achieve the consistency of the grey level between the display pixel and the readout pixel. In one embodiment of the present invention, only the $C_{ST}$ of the display pixel is adjusted so that the $C_C$ is not formed in the display pixel. The equivalent circuits of the display pixel and the readout pixel are similar to the prior art. Please refer to the display pixel of FIG. 4(a) and the readout pixel of FIG. 4(b), when turning off the pixel TFT 41, the gate electrode voltage of the pixel TFT 41 changes from $V_{gh}$ to $V_{gl}$. Therefore, the gate electrode of the pixel TFT 41 has a voltage variation $\Delta V_g = V_{gh-Vgl}$, which causes feed through effect and results in a voltage variation of pixel electrode. In the display pixel, the voltage variation of pixel electrode is $\Delta V_p$, and in the readout pixel, the voltage variation of pixel electrode is $\Delta V'_p$.

$$\Delta V_p = \frac{C_{GS}}{C_{LC} + C_{ST} + C_{GS}} \Delta V_g;$$

$$\Delta V'_p = \frac{C_{GS}}{C'_{LC} + C'_{ST} + C_{read\text{-}out} + C_{GS}} \Delta V_g$$

When $\Delta V_p = \Delta V'_p$:

$$C_{ST} = \Delta C_{LC} + C'_{ST} + C_{read\text{-}out} \quad (5)$$

$$\Delta C_{LC} \equiv C'_{LC} - C_{LC}$$

The above-mentioned equation (5) must be satisfied displayso as to make the grey level of the display pixel consistent with the grey level of the readout pixel. However, the storage capacitor $C'_{ST}$ in the readout pixel is formed optionally. When the storage capacitor $C'_{ST}$ is omitted, the following equation (6) replaces the equation (5).

$$C_{ST} = \Delta C_{LC} + C_{read\text{-}out} \quad (6)$$

In another embodiment of the present invention, both the $C_{ST}$ and the $C_C$ of the display pixel are adjusted, and the equivalent circuits of the display pixel and the readout pixel using the two-level driving method are as shown in FIGS. 7(a), 7(b) and 7(c). Taking the display pixel of FIG. 7(a) and the readout pixel of FIG. 7(c) as example, when turning off the pixel TFT 71, the gate electrode voltage of the pixel TFT 71 changes from $V_{gh}$ to $V_{gl}$. Therefore, the gate electrode of the pixel TFT 71 has a voltage variation $\Delta V_g = V_{gh} - V_{gl}$, which causes feed through effect and results in a voltage variation of the pixel electrode. In the display pixel, the voltage variation of the pixel electrode is $\Delta V_p$, and in the readout pixel, the voltage variation of the readout pixel is $\Delta V''_p$.

$$\Delta V_p = \frac{C_{GS}}{C_{LC} + C_{ST} + C_C + C_{GS}} \Delta V_g;$$

$$\Delta V''_p = \frac{C_{GS}}{C''_{LC} + C''_{ST} + C_{read\text{-}out} + C_{GS}} \Delta V_g$$

When $\Delta V_p = \Delta V''_p$:

$$C_{ST} + C_C = \Delta C_{LC} + C''_{ST} + C_{read\text{-}out} \quad (7)$$

$$\Delta C_{LC} \equiv C''_{LC} - C_{LC}$$

The above-mentioned equation (7) must be satisfied so as to make the grey level of the display pixel consistent with the grey level of the readout pixel. However, the storage capacitor $C_{ST}$ in the display pixel and the storage capacitor $C'_{ST}$ in the readout pixel are formed optionally. When both the storage capacitors $C_{ST}$ and $C'_{ST}$ are omitted, the following equation (8) replaces the equation (7).

$$C_C = \Delta C_{LC} + C_{read\text{-}out} \quad (8)$$

Figure 1:
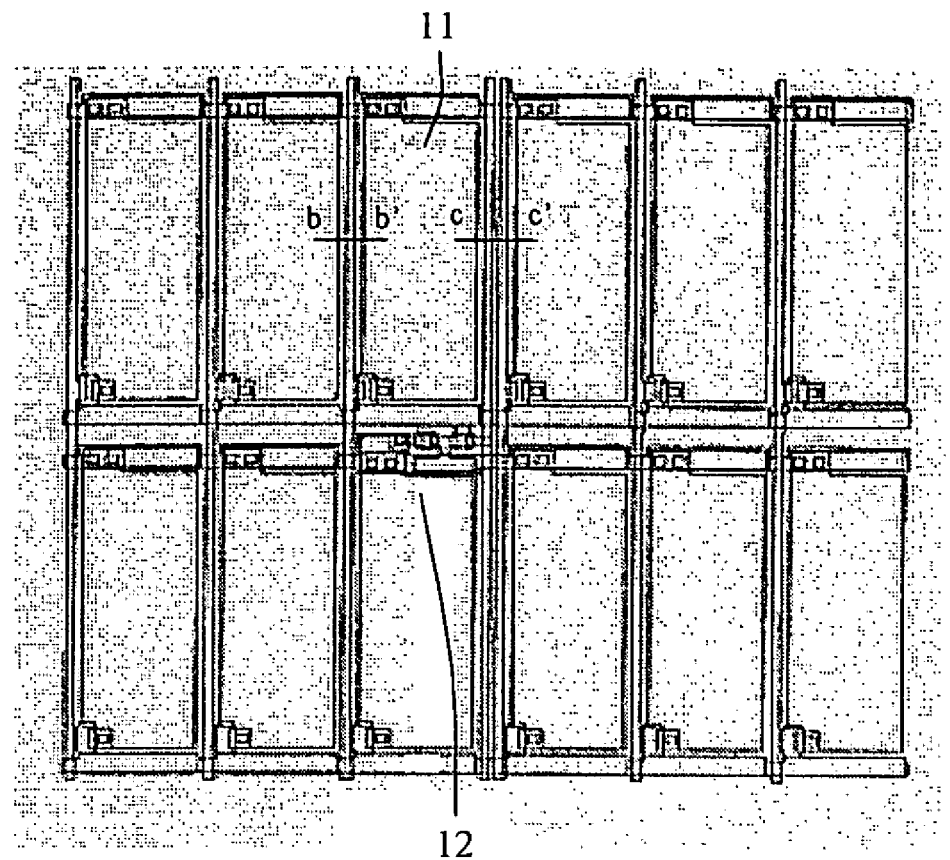
FIG. 1 shows the layout of an embedded touch screen in the prior art.
Figure 2:
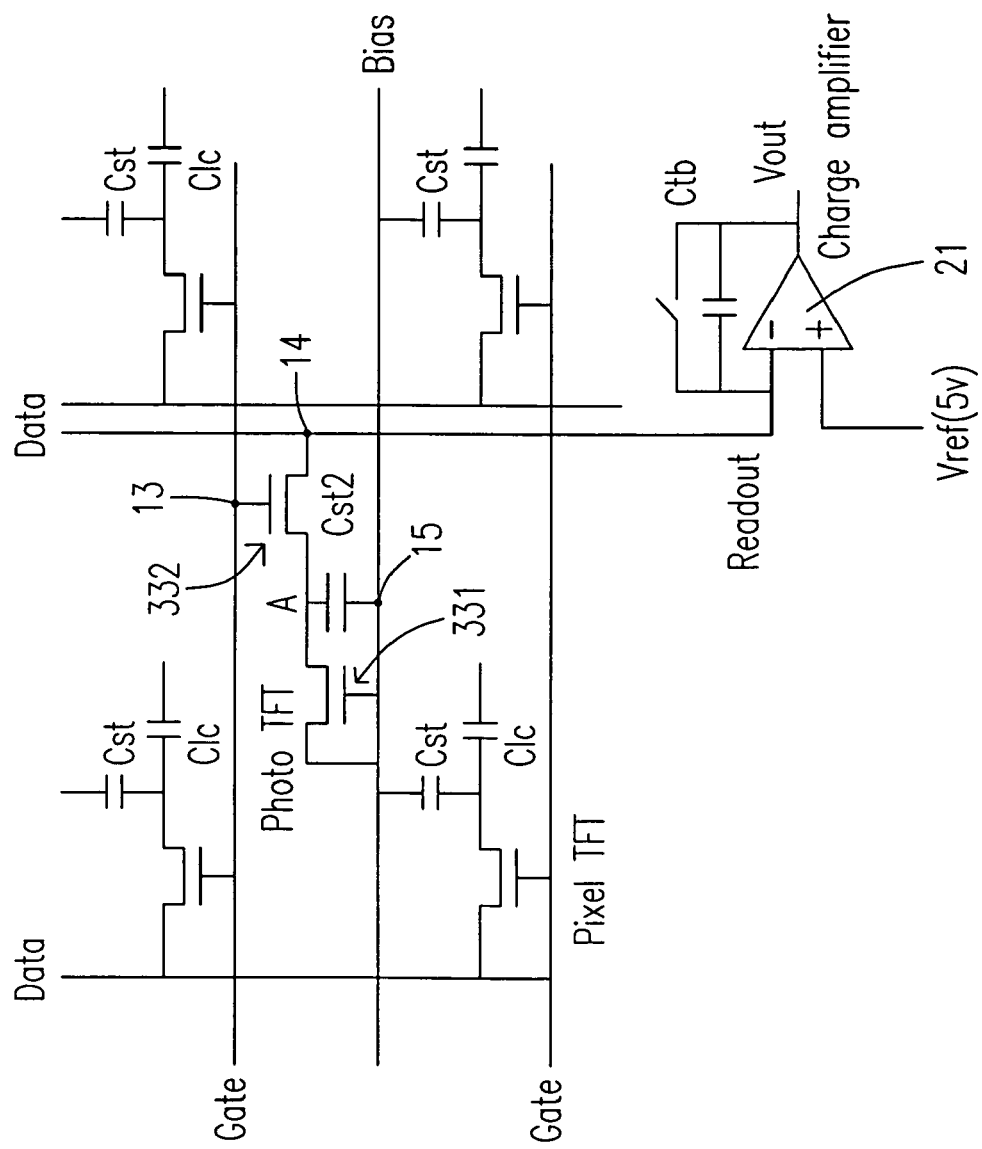
FIG. 2 shows the equivalent circuit of the embedded touch screen of FIG. 1.
Figure 3A:
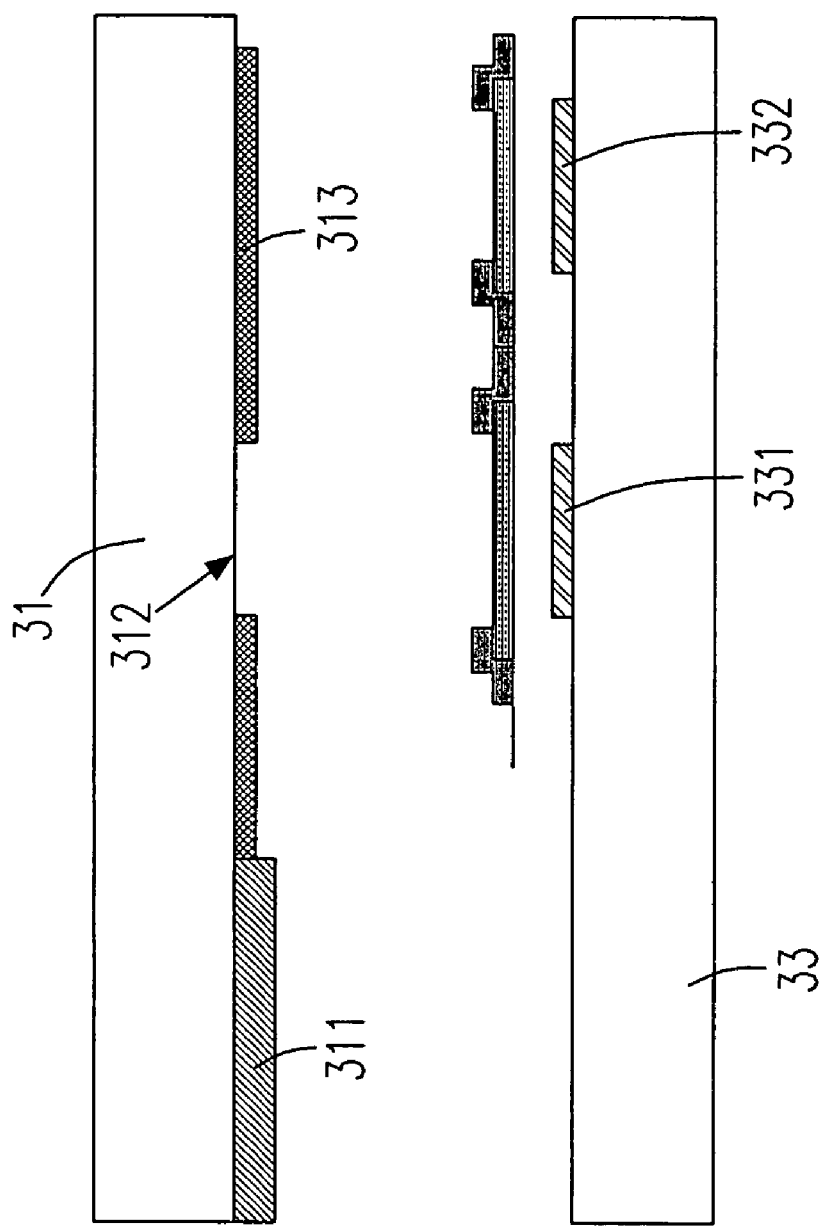
FIG. 3(a) is a cross-sectional view of the embedded touch screen of FIG. 1.
Figure 3B:
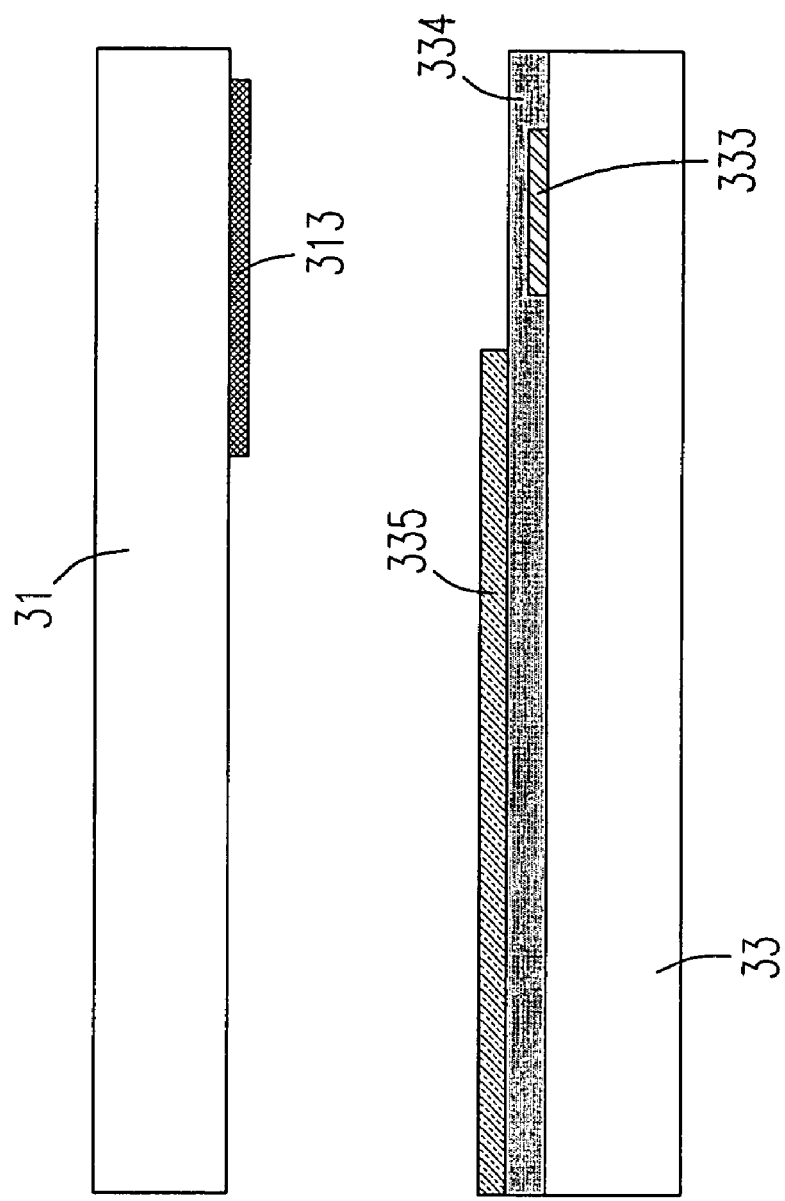
FIG. 3(b) shows a cross-sectional view of a display pixel along the cutting line b-b' of FIG. 1.
Figure 3C:
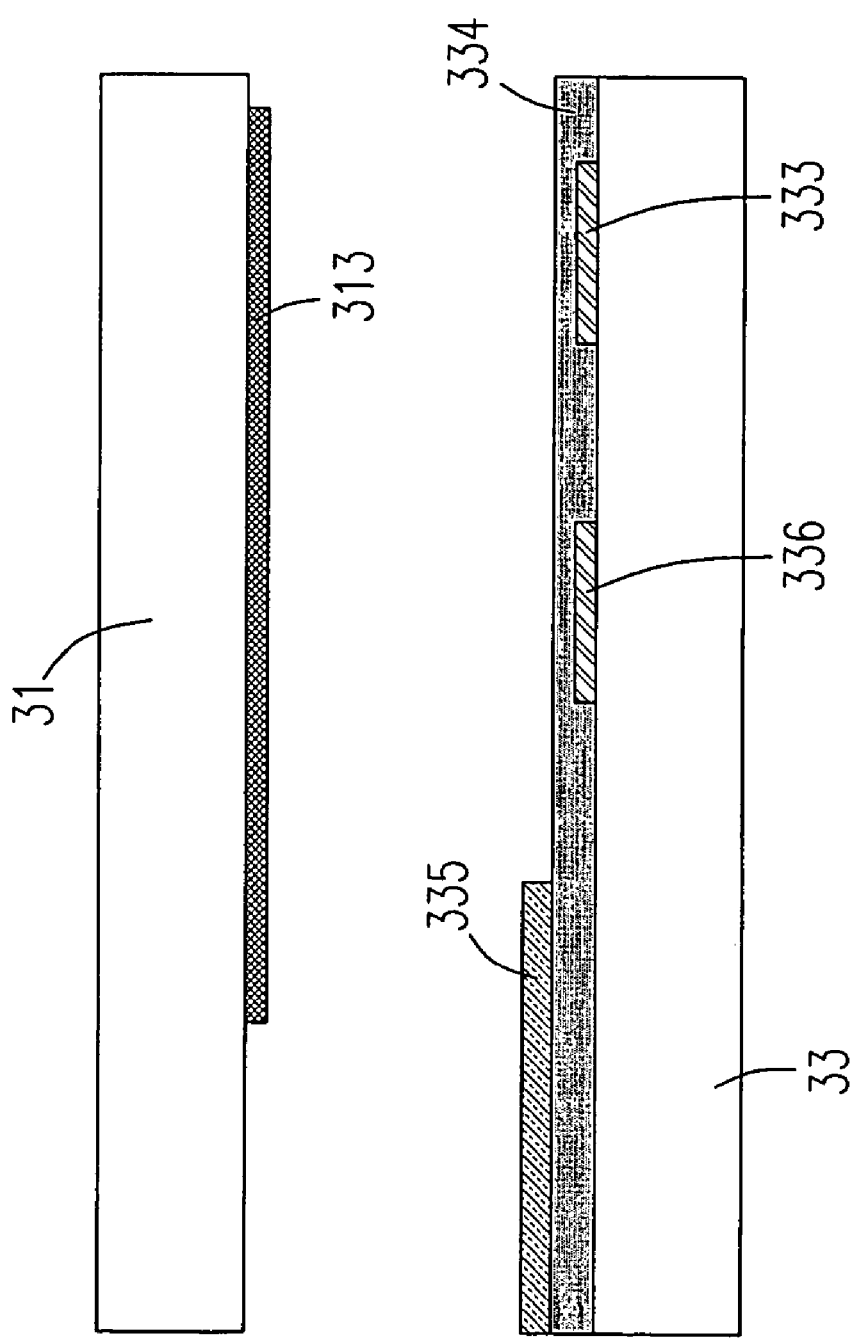
FIG. 3(c) shows a cross-sectional view of a readout pixel along the cutting line c-c' of FIG. 1.
Figure 10:
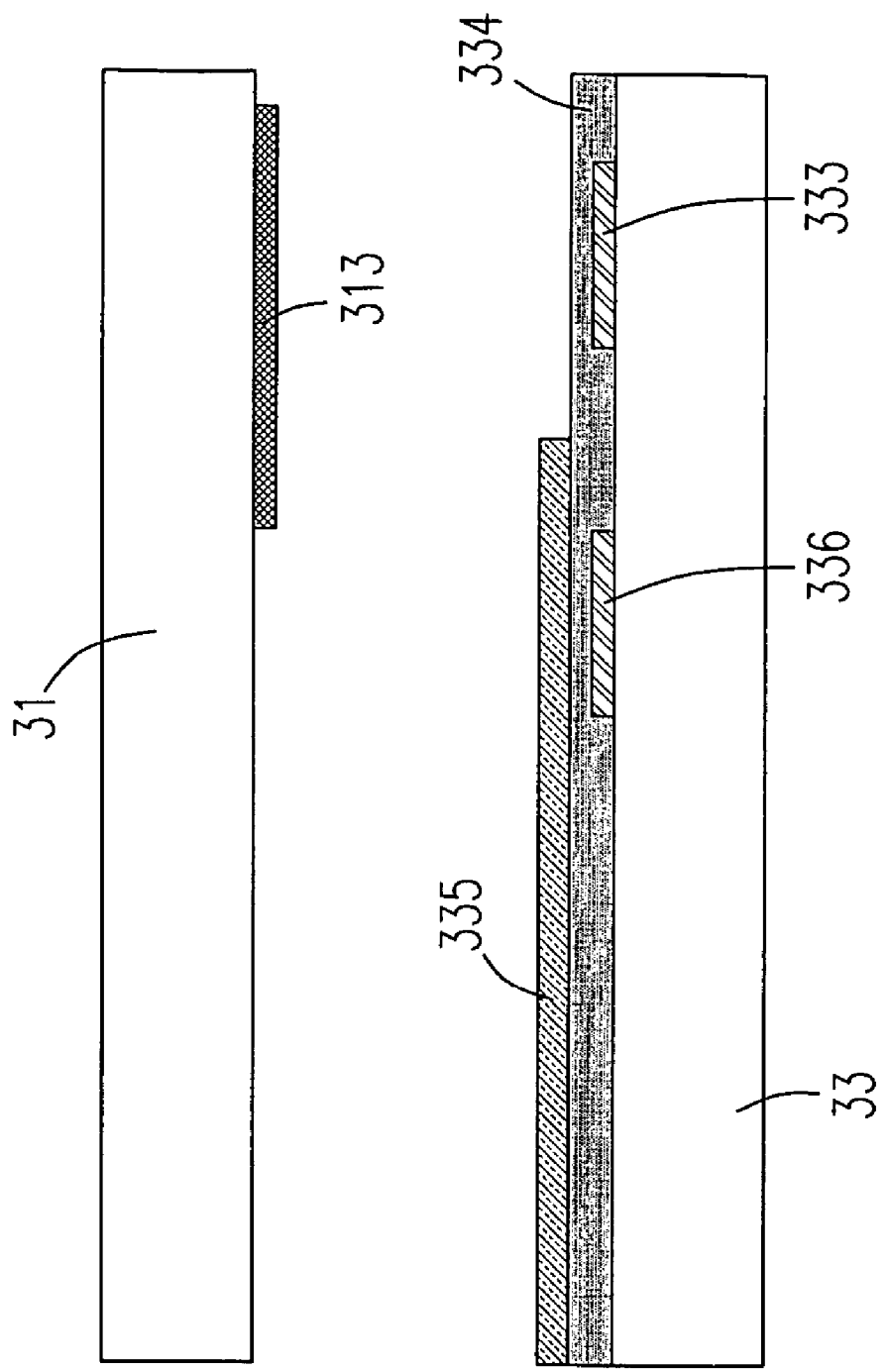
FIG. 10 is a cross-sectional view of the readout pixel of the present invention.

Although the equivalent circuit of the readout pixel in the embedded touch screen of the present invention is the same as that of the prior art, the pixel electrode layout of the readout pixel is modified by the present invention. As shown in FIG. 10, which shows a cross-sectional view of the readout line 336 and data line 333 in the readout pixel according to the present invention, the readout line 336 and the pixel electrode 335 are overlapped, and the black matrix 313 formed on the upper substrate 31 only shields the data line 333 and portions of the pixel electrode 334 to prevent light leak. In other words, the black matrixes of the readout pixels and of the display pixels almost have the same area. Consequently, the readout pixel has an improved aperture ratio and optical performance in comparison with the readout pixel of the prior art as shown in FIG. 3(c).

In conclusion, the present invention provides a pixel structure for the LCD with the embedded touch screen. In the present invention, a compensation capacitor is added in the display pixel so that the grey level inconsistency between the display pixel and the readout pixel is eliminated. Accordingly, the present invention can effectively solve the problems and drawbacks in the prior art, and thus it fits the demand of the industry and is industrially valuable.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A pixel structure for an liquid crystal display (LCD) with an embedded touch screen, comprising:
   a plurality of first pixels and a plurality of second pixels, each formed by intersecting two adjacent gate lines and two adjacent data lines, said first pixel comprising:
   a pixel transistor having a gate electrode connected to one of said gate lines, a drain electrode connected to one of said data lines, and a source electrode;
   a pixel electrode connected to said source electrode of said pixel transistor;
   a liquid crystal capacitor $C_{LC}$ formed between said pixel electrode and a common electrode;
   a compensation capacitor $C_C$ formed between said pixel electrode and a compensation electrode; and
   said second pixel comprising:
   a pixel transistor having a gate electrode connected to one of said gate lines, a drain electrode connected to one of said data lines, and a source electrode;
   a pixel electrode connected to said source electrode of said pixel transistor;
   a liquid crystal capacitor $C_{LC}''$ formed between said pixel electrode and a common electrode;
   a readout capacitor $C_{read\text{-}out}$ between said pixel electrode and a readout line, wherein said pixel electrode is positioned above said readout line, and said pixel electrode and said readout line are overlapped.

2. The pixel structure as claimed in claim 1, wherein said first pixel further comprises a storage capacitor $C_{ST}$ formed between said pixel electrode and a common line, and said second pixel further comprises a first storage capacitor $C_{ST}''$ formed between said pixel electrode and a common line.

3. The pixel structure as claimed in claim 2, wherein both said common electrode and said common line of said first pixel and said second pixel are connected to a common voltage source.

4. The pixel structure as claimed in claim 1, wherein said readout line of said second pixel is parallel with said data lines.

5. The pixel structure as claimed in claim 1, wherein said second pixel further comprises a photo transistor, a readout transistor, and a second storage capacitor composing an optical sensor element.

6. The pixel structure as claimed in claim 1, wherein said compensation electrode of said first pixel is said gate line that is not electrically connected to said transistor.

7. The pixel structure as claimed in claim 1, wherein said compensation electrode of said compensation capacitor is an external electrode.

8. The pixel structure as claimed in claim 7, wherein said external electrode is parallel with said data line and has a constant potential.

9. The pixel structure as claimed in claim 1, when a two-level driving method is applied to said LCD with an embedded touch screen, said capacitors of said first pixel and said second pixel have capacitances corresponding to the following equation:

$$C_C = \Delta C_{LC} + C_{read-out}$$

wherein $\Delta C_{LC} \equiv C''_{LC} - C_{LC}$.

10. The pixel structure as claimed in claim 2, when a two-level driving method is applied to said LCD with an embedded touch screen, said capacitors of said first pixel and said second pixel have capacitances corresponding to the following equation:

$$C_{ST} + C_C = \Delta C_{LC} + C''_{ST} + C_{read-out}$$

wherein $\Delta C_{LC} \equiv C''_{LC} - C_{LC}$.

11. The pixel structure as claimed in claim 3, when a row-inversion driving method with said common voltage modulation is applied to said LCD with an embedded touch screen, said capacitors of said first pixel and said second pixel have capacitances corresponding to the following two equations:

$$\frac{C''_{LC} + C''_{ST}}{C''_{LC} + C''_{ST} + C_{read-out} + C_{GS}} = \frac{C_{LC} + C_{ST}}{C_{LC} + C_{ST} + C_C + C_{GS}}$$

and $$\frac{C_{LC} + C_{ST}}{C''_{LC} + C''_{ST}} \cong 1$$

where $C_{GS}$ is a parasitic capacitor formed between said gate electrode and said source electrode of said pixel transistor.

12. The pixel structure as claimed in claim 1, wherein said second pixel is a readout pixel.

13. A pixel structure for an liquid crystal display (LCD) with an embedded touch screen, comprising:
a plurality of first pixels and a plurality of second pixels, each formed by intersecting two adjacent gate lines and two adjacent data lines, said first pixel comprising:
a pixel transistor having a gate electrode connected to one of said gate lines, a drain electrode connected to one of said data lines, and a source electrode;
a pixel electrode connected to said source electrode of said pixel transistor;
a liquid crystal capacitor $C_{LC}$ formed between said pixel electrode and a common electrode;
a storage capacitor $C_{ST}$ formed between said pixel electrode and a common line; and
said second pixel comprising:
a pixel transistor having a gate electrode connected to one of said gate lines, a drain electrode connected to one of said data lines, and a source electrode;
a pixel electrode connected to said source electrode of said pixel transistor;
a liquid crystal capacitor $C_{LC}''$ formed between said pixel electrode and a common electrode;
a readout capacitor $C_{read-out}$ between said pixel electrode and a readout line, wherein said pixel electrode is positioned above said readout line, and said pixel electrode and said readout line are overlapped.

14. The pixel structure as claimed in claim 13, wherein said second pixel further comprises a first storage capacitor $C_{ST}''$ formed between said pixel electrode and a common line.

15. The pixel structure as claimed in claim 13, wherein said readout line of said second pixel is parallel with said data lines.

16. The pixel structure as claimed in claim 13, wherein said second pixel further comprises a photo transistor, a readout transistor, and a second storage capacitor composing an optical sensor element.

17. The pixel structure as claimed in claim 13, when a two-level driving method is applied to said LCD with an embedded touch screen, said capacitors of said first pixel and said second pixel have capacitances corresponding to the following equation:

$$C_{ST} = \Delta C_{LC} + C_{read-out}$$

wherein $\Delta C_{LC} \equiv C''_{LC} - C_{LC}$.

18. The pixel structure as claimed in claim 14, when a two-level driving method is applied to said LCD with an embedded touch screen, said capacitors of said first pixel and said second pixel have capacitances corresponding to the following equation:

$$C_{ST} \Delta C_{LC} + C''_{ST} + C_{read-out}$$

wherein $\Delta C_{LC} \equiv C''_{LC} - C_{LC}$.

19. The pixel structure as claimed in claim 13, wherein said second pixel is a readout pixel.

* * * * *

UNITED STATES PATENT AND TRADEMARK OFFICE
CERTIFICATE OF CORRECTION

PATENT NO. : 7,573,459 B2  Page 1 of 1
APPLICATION NO. : 11/341290
DATED : August 11, 2009
INVENTOR(S) : Shih et al.

It is certified that error appears in the above-identified patent and that said Letters Patent is hereby corrected as shown below:

IN THE CLAIMS

In Column 11, Line 25, in Claim 10, after "where", replace $\Delta C_{LC} \equiv C''_{LC\text{-}CLC}$" with --$\Delta C_{LC} \equiv C''_{LC} - C_{LC}$.--

In Column 12, Line 45, in Claim 18, replace $C_{ST}\Delta C_{LC} + C''_{ST} + C_{read\text{-}out}$" with --$C_{ST} = \Delta C_{LC} + C''_{ST} + C_{read\text{-}out}$--

Signed and Sealed this

Tenth Day of November, 2009

David J. Kappos
*Director of the United States Patent and Trademark Office*